Aug. 21, 1945.  W. KITTS  2,383,199
HOSE CLAMP
Filed Aug. 20, 1943
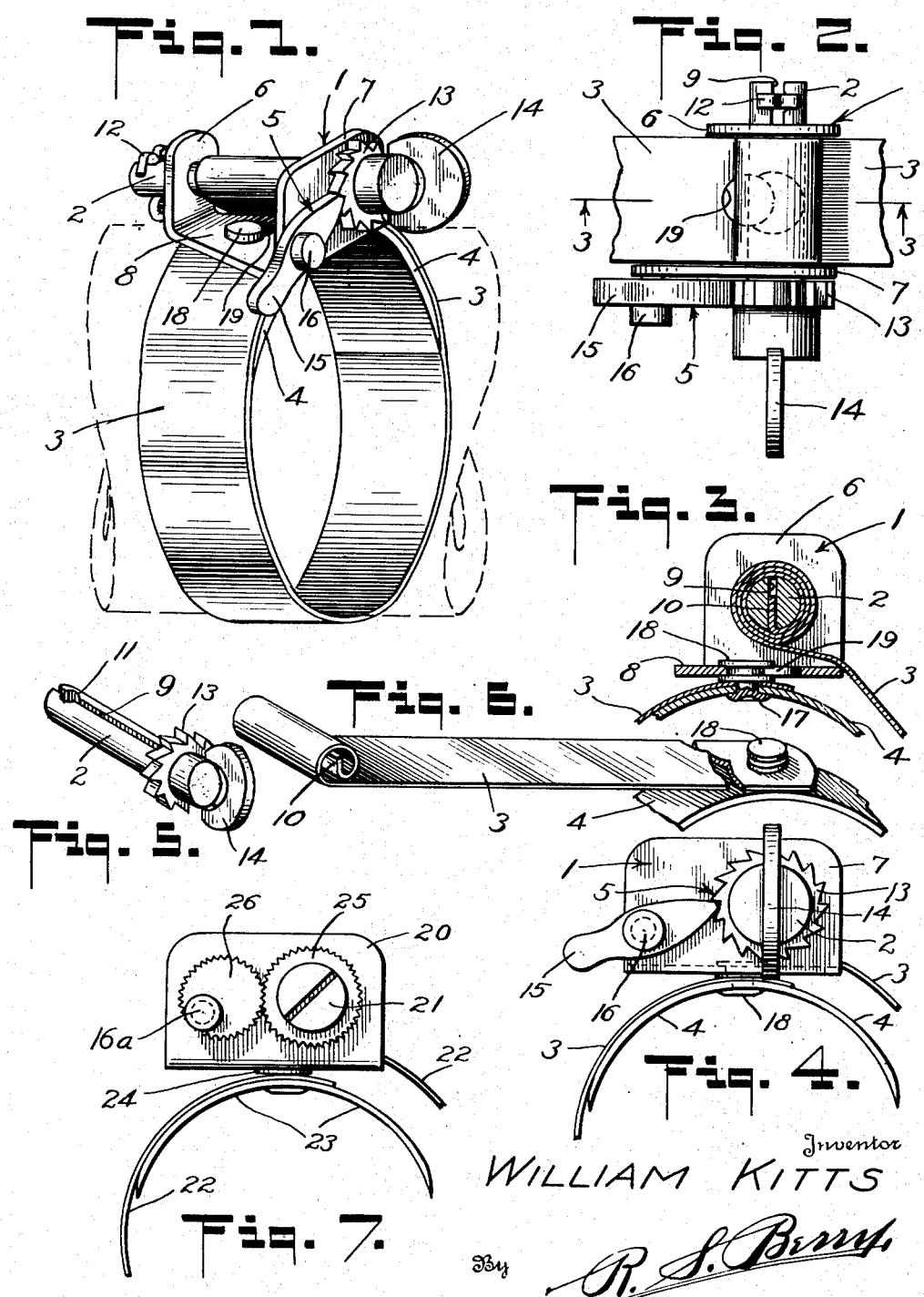
Inventor
WILLIAM KITTS
By R. S. Berry,
Attorney Patented Aug. 21, 1945

2,383,199

UNITED STATES PATENT OFFICE 2,383,199

HOSE CLAMP

William Kitts, Los Angeles, Calif., assignor to Adel Precision Products Corp., a corporation of California Application August 20, 1943, Serial No. 499,426

8 Claims. (Cl. 24—19)

This invention relates to hose clamps of the type in which a hose clamping band is tightened by being wound on a shaft carried by a body member to which latter the band is also connected.

The primary object of this invention is to provide an improved hose clamp of the type described which may be applied and removed with greater ease and dispatch to hoses of different diameters, will effect and maintain a more secure and reliable clamping action with marked uniformity of pressure throughout 360 degrees and will eliminate the exacting and tedious operation of threading the band through slots or eyes in the shaft or body member each time the clamp is applied, as well as prevent weakening, damage and breaking of the band whereby the clamp is subject to repeated efficient use.

Another object of my invention is to provide a hose clamp of the character described in which one end of the flexible clamping band is fixed to the winding shaft and the other or "free" end is subject to a quick detachable connection with the shaft-supporting body member and has fixed thereto a hose engaging shoe which is brought into hose engaging position between the body member and the hose and inside the band when said "free" end is connected with said body member, thereby facilitating a quick and easy application and removal of the clamp and the attainment of the advantages herein recited in a most efficacious manner.

Another object of this invention is to provide in a hose clamp of the character described a simple and efficient releasable latch means for locking the winding shaft against unwinding when the clamp is in clamping position on the hose.

A further object is to provide a hose clamp of the character described which affords an additional improvement in the art by reason of the use of a dual purpose fastening element on the free end of the clamping band, said element being readily and easily detachably engagable in an opening in the body member to connect the band thereto and also serving as a fastening for fixing the hose engaging shoe to the band.

With the foregoing objects in view, together with such other objects and advantages as may subsequently appear, the invention resides in the parts and in the combination, construction and arrangement of parts hereinafter described and claimed and illustrated by way of example in the accompanying drawing, in which:

Fig. 1 is a perspective view of a clamp embodying my invention as applied;

Fig. 2 is a fragmentary top plan view of the clamp as applied;

Fig. 3 is a fragmentary sectional view taken on the line 3—3 of Fig. 2;

Fig. 4 is a fragmentary side-elevation of the clamp particularly showing the latch or lock means;

Fig. 5 is a perspective view of the winding shaft as removed from the clamp;

Fig. 6 is a fragmentary perspective view of the clamping band as removed from the clamp and showing how the hose-engaging shoe is fixed to and carried by one end thereof;

Fig. 7 is a fragmentary side elevation of a modified form of my invention wherein a different form of lock or latch means is employed.

Referring to the accompanying drawing more specifically, it is seen that one embodiment of my invention generally comprises a U-shaped body member 1, a rotary winding shaft 2 supported thereby, a hose clamping band 3 of suitable flexible resilient metal similar to spring steel, but not necessarily as stiff as the usual spring fixed at one end to the shaft and adapted to be detachably connected at its other or free end to the body member; a hose engaging shoe 4 fixed to the free end of the band so that when the latter is connected with the body member the shoe is brought into hose engaging position under the body, and a releasable latch or lock means 5 for holding the shaft against unwinding when the band is wound thereon to tighten the clamp on the hose.

As here provided the opposed ear portions 6 and 7 of the U-shaped body member 1 support the winding shaft 2 therebetween so that the ends of the shaft project outwardly therefrom and the shaft lies well above the plate-like base 8 of the body member. The shaft is provided with a longitudinal slot 9 opening at one end thereof and adapted to have a preformed barrel hook 10 on the band 3 preferably permanently hooked therein so that the band may be wound on and unwound from the shaft without detaching the hook from the shaft. A cotter pin hole 11 extends through the shaft parallel to the opposed walls of the slot 9 so that when the cotter pin 12 is installed it will prevent the collapse of the slotted shaft and hold it to a true circular cross section making for the winding of the band in an even coil of small compass.

The other end of the shaft 2 is provided as here shown with a ratchet wheel 13 fixed thereto to act as a stop against the outer face of the ear 7 and which, together with the cotter pin, holds the shaft in place. A thumb piece or handle 14 is also provided on the end of the shaft adjacent the ratchet wheel whereby the shaft may be conveniently rotated to wind and unwind the band 3.

A pawl 15 is pivoted as at 16 on the ear 7 which it is noted is longer than ear 6 to accommodate the pawl, this pawl may be held in such position against the ratchet wheel as to prevent unwinding rotation of the shaft and may be quickly swung into position releasing the ratchet wheel and shaft for unwinding rotation.

An important feature of this invention is the provision for effecting a quick and detachable connection of the free end of the band 3 with the base 8 of the U-shaped body portion 1 so that it is unnecessary to thread the ends or ends of the band through eyes or slots in the shaft or body member as has been the practice in this art. Moreover, the particular form of fastening means here used for effecting the aforesaid detachable connection of the free end of the band, also serves to fix the arcuate shoe 4 to said free end so that upon connection of the latter to the body member the shoe is properly positioned on the hose beneath the body member.

As here shown the shoe 4 is made of stiff spring metal having considerably more rigidity than the band 3 but substantially equal in width thereto. A rivet 17 having a double head 18 is employed to fix the shoe 4 to the free end of the band 3 with the rivet passing through the shoe at a point centrally of the ends thereof and fixing it securely at that point to the inner surface of said free end. The double head 18 projects outwardly from the band so that it may be engaged and held in a key hole slot 19 in the base 8 of the body member 1 as shown in Fig. 3, with the outer portion of the double head overlying the narrower part of the slot whereby the band is securely connected to the body member. The wider portion of the slot 19 provides for the insertion of the head 18 into the key hole slot as well as for removal thereof from the slot.

The shoe lies under, that is, against the inner side of the band 3 for about half the length of the shoe. The remaining portion of the shoe projects from the free end of the band as a continuation thereof, in effect. Upon connecting the free end of the band to the body member, the shoe 4 is automatically brought into proper hose-engaging position with the projected part thereof lying under and engaged by the inner face of that portion of the strap leading from the hose up to winding shaft, while the other half of the shoe lies under the free end portion of the strap leading from the hose up to the point of connection thereof with the base 8 of body member 1. The body member is then centered between the ends of and upon the shoe, whereby the band and shoe will provide for a uniform pressure and clamping action circumferentially of the hose upon the winding of the band on the hose by means of the shaft 2.

It should be noted that by having the shoe carried on the free end of the band, with the body member and winding means carried on the other end of the band it is possible to readily and easily apply the band to hoses of various diameters by merely snapping the headed fastening 18 into the opening 19 in the base 8 and then winding the band on the shaft 2, the latch means 6 comprising the ratchet wheel 13 and pawl 15 then operating to hold the shaft against unwinding.

It is apparent that the clamp hereof may be quickly removed by releasing the pawl 15 and unwinding the band sufficiently to release the headed fastening 18 from the slot 19 in the body member, thereby detaching the "free" end of the band and permitting of removal of the clamp. The construction of the clamp permits of repeated application and removal without damage to the band and its related parts primarily because it is unnecessary to detach the band from the winding shaft and due to the particular manner of detachably connecting the band with the body member, also due to the presence in the combination of parts of the particular hose engaging shoe carried by the free end of the band, and because all the parts of the device are connected together and so remain in the particular manner here shown, when the clamp is removed and ready for application to a hose.

A modified form of my invention as shown in Fig. 7 includes a body member 20, winding shaft 21, a band 22, a shoe 23 carried by said band and a fastening means 24 for detachably securing the free end of the band to the body member with all such parts substantially of the same construction and arrangement as the corresponding parts of the first described form of my invention. In this modified form the lock or latching means is of different construction and comprises a peripherally serrated or knurled wheel 25 fixed on the shaft 21 and a serrated or knurled member 26 having its peripheral portion eccentrically pivoted at 16a to said member 20 and movable into and out of holding contact with the serrated wheel 25. Such a locking means, due to the minute serrations thereof, affords a greater range of tightening adjustments of the shaft and is set and released in the same manner as the pawl and ratchet locking device except that a wedging action assuring a most reliable locking of the shaft is afforded by the eccentric member 26. This form of latch may be preferred in some instances as it is less likely to jar loose or be accidentally struck and released due to its smaller size, its wedging action, and the fact that no part thereof projects outwardly beyond the margins of the body member.

This form of the invention further differs from the first described form in that it has a screw driver slot 27 in one end of the shaft 21 instead of a finger piece or handle, to provide for the turning of the shaft.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a hose clamp, a body member, a rotary winding shaft supported on said body member, a flexible hose clamping band having one end fixed to and adapted to be wound on the said shaft, means for detachably connecting the other end of the band to the body member, an arcuate hose-engaging shoe fixed intermediate its ends to said other end of the band so that it will be disposed between the hose and the body member when said other end of the band is connected with the body member, and means for releasably holding said shaft against unwinding.

2. In a hose clamp, a body member, a rotary winding shaft supported by said body member, a flexible hose clamping band having one end fixed to said winding shaft, an arcuate hose-engaging shoe, a fastening element securing said shoe to the other end of said band, and a head on said fastening element for detachably connecting said band to said body member at the convex side of said arcuate shoe.

3. In a hose clamp, a body member, a rotary winding shaft supported by said body member, a flexible resilient metal hose-clamping band having one end fixed to and adapted to be wound on said shaft, a shoe fixed to the other end of said band so as to lie against the hose and inside the band when said other end of the band is connected to the body portion, and means for detachably connecting said other end of the band to said body portion at the convex side of said arcuate shoe.

4. In a hose clamp, a body member, a rotary winding shaft supported by said body member, a flexible resilient metal hose-clamping band having one end fixed to and adapted to be wound on said shaft, a shoe fixed to the other end of said band so as to lie against the hose and inside the band when said other end of the band is connected to the body portion, and means for detachably connecting said other end of the band to said body portion, said shoe being of substantially the same width as said band and curved to substantially conform to the curved surface of the hose with a portion thereof projecting beyond the end of the band to which the shoe is attached so that said extended portion will lie under and in contact with that part of the band extending from the hose to said winding shaft.

5. In a hose clamp, a body member, a rotary winding shaft supported by said body member, a flexible resilient metal hose-clamping band having one end fixed to and adapted to be wound on said shaft, a shoe fixed to the other end of said band so as to lie against the hose and inside the band when said other end of the band is connected to the body portion, and means for detachably connecting the band, at a point thereon which lies over the convex side of said shoe, to said body member.

6. In a hose clamp, a body member, a rotary winding shaft supported by said body member, a flexible resilient metal hose-clamping band having one end fixed to and adapted to be wound on said shaft, a shoe fixed to the other end of said band so as to lie against the hose and inside the band when said other end of the band is connected to the body portion, said body member having an opening therein, and a fastening member on said other end of the band engageable in said opening for detachably connecting the band thereto.

7. In a hose clamp, a body member, a rotary winding shaft supported by said body member, a flexible resilient metal hose-clamping band having one end fixed to and adapted to be wound on said shaft, a shoe fixed to the other end of said band so as to lie against the hose and inside the band when said other end of the band is connected to the body portion, means for detachably connecting said other end of the band to said body portion, a circular member fixed on said shaft for rotation therewith having a serrated periphery, and a locking member eccentrically pivoted on said body member for movement into and out of contact with said circular member to releasably hold the shaft against unwinding rotation, said locking member consisting of a peripherally serrated wheel.

8. In a hose clamp, a body member, a rotary winding shaft mounted on said body member, a flexible hose clamping band having one end secured to said winding shaft, and an arcuate hose engaging shoe which is attached both to the opposite end of said band and to said body member.

WILLIAM KITTS.